UNITED STATES PATENT OFFICE.

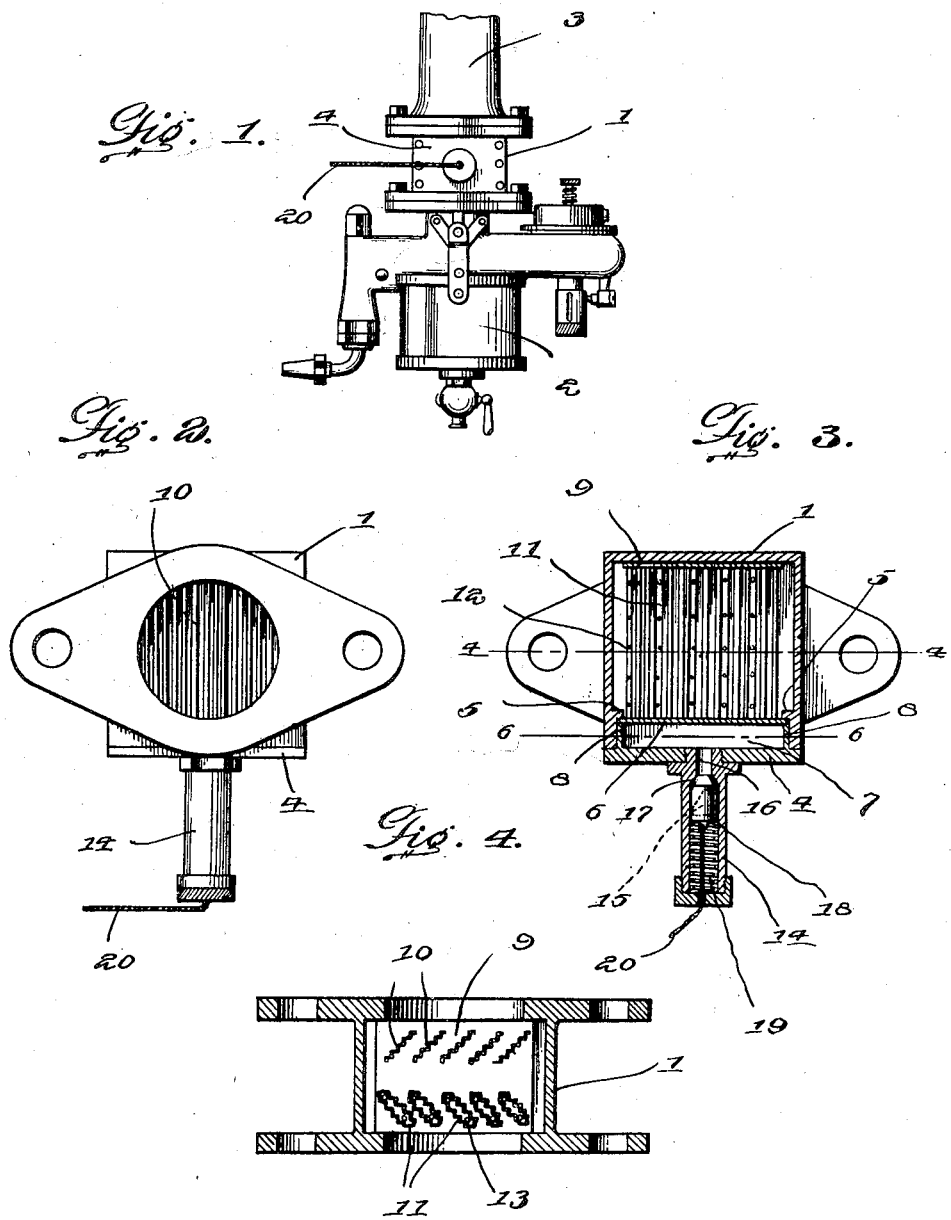

RALPH H. MacDONALD, OF CENTRALIA, WASHINGTON.

GASOLENE-VAPORIZER.

1,128,470. Specification of Letters Patent. Patented Feb. 16, 1915.

Application filed June 10, 1914. Serial No. 844,263.

*To all whom it may concern:*

Be it known that I, RALPH H. MAC-DONALD, a citizen of the United States, residing at Centralia, in the county of Lewis and State of Washington, have invented new and useful Improvements in Gasolene-Vaporizers, of which the following is a specification.

The invention has for its primary object to produce a saving in the liquid fuel utilized in the operation of internal combustion engines and at the same time increase the power and efficiency of the engine.

The invention provides a device to be introduced in the passage between the carbureter and cylinder of an internal combustion engine for supplying air to the gaseous mixture and insuring a thorough commingling of such air with the mixture, whereby any particles of the fuel contained in such mixture will be vaporized with the result that a homogeneous mixture is supplied to the engine with the result that a more perfect combustion is assured.

The invention consists of a chamber containing baffles and provided with a plurality of air inlets, such baffles causing the gaseous mixture to take a tortuous path as well as to insure a thorough agitation of the gaseous mixture which is free from any free particles of fuel and when ignited produces gases which give off a minimum amount of carbon to deposit upon the cylinder and adjunctive parts.

The invention further provides a mixing chamber containing hollow baffles in which the incoming air is received, said baffles having a plurality of minute openings for the discharge of the air in a manner to insure its blending with the gaseous mixture to increase its combustible quality with the result that the power of the engine is materially increased and thereby enabling the fuel consumption to be proportionately reduced for the amount of developed power.

The invention consists of the novel features, details of construction and combination of parts, which hereinafter will be more particularly set forth, illustrated and claimed.

In the drawings hereto attached:—Figure 1 is a side view of the invention showing the same applied. Fig. 2 is a top plan view. Fig. 3 is a horizontal section. Fig. 4 is a vertical longitudinal section on the line 4—4 of Fig. 3.

Corresponding and like parts are referred to in the following description, and indicated in all the views of the drawing, by the same reference characters.

The numeral 1 designates a chamber which may be of any construction or size, the same being located in the passage by means of which the gaseous mixture is supplied to the engine. This chamber as shown is adapted to be coupled to the carbureter 2 and the manifold 3. For this purpose the chamber is provided at opposite ends with flanges which are apertured to receive the bolts or fastenings by means of which the chamber is secured to the respective parts. The flanged ends of the chamber are formed with openings, the one for the inlet and the other for the outlet of the gaseous mixture. One side of the chamber is open and is adapted to be closed by means of a plate 4 which may be secured to the chamber in any manner when placed in position. Inner projections 5 are located upon opposite sides of the chamber near the open end and are adapted to engage and limit the inward movement of a plate 6 to which the several baffles are attached. An air space 7 is formed between the plates 4 and 6. The plate 4 is formed upon its inner side with projections 8 which engage the plate 6 and hold it in proper position. A plate 9 is located at the opposite side of the chamber 1 and has the several baffles attached thereto. The plate 9 is of a length to pass by the inner projections 6 thereby admitting of the baffles and their supporting plates 6 and 9 being removed from the chamber 1 or placed in position therein. The baffles are provided in two sets as indicated at 10 and 11. The baffles 10 consist of single plates which are corrugated, and arranged in spaced parallel relation and at an angle to straight lines connecting the inlet and outlet openings of the chamber 1. The baffles 11 are hollow and are arranged in parallel and spaced relation and at an angle the reverse of the bafflles 10. The faces of the baffles 11 are corrugated or fluted. A plurality of minute openings 12 are formed in the edges of the hollow baffles 11, and constitute outlets for the air which is to be mixed with gaseous mixture passing through the device. Openings 13 are formed in the plate 6 in position to register with the spaces inclosed by the several hollow baffles 11 and such openings 13 establish communication between the air space 7 and the spaces of the baffles 11.

The air to be mixed with the gaseous mixture is admitted into the chamber 1 in regulated quantity which is at all times under control of the driver. For this purpose a suitable valve mechanism is provided and attached to the chamber 1 and as shown such valve mechanism comprises a casing 14 which is provided in one side with a tapered opening 15 which constitutes the air inlet. The casing 14 is carried by the plate 4 and is in communication with the air space 7 by means of an opening 16. A valve seat 17 is formed at the inner end of the opening 16 and a plug valve 18 is adapted to close thereon and cover the inlet openings 15 and the opening 16. An expansible spring 19 arranged within the casing 14 normally holds the valve 18 seated. A connection 20 extends from the valve 18 to a control lever, not shown, within convenient reach of the driver so as to be operated to unseat the valve 18 more or less to regulate the air to be supplied to the gaseous mixture for tempering and gasifying the same.

With reference to the valve casing 14 the opening 15 is the inlet and the opening 16 the outlet. By having the opening 15 of tapering form the amount of air admitted may be regulated to the best possible advantage. Movement of the valve 18 uncovers or covers both the air inlet and outlet as will be readily understood. When the valve 18 is closed the gaseous mixture passes direct to the engine without having any additional air added thereto, but the baffles act in a measure as beaters to break up any particles of fuel that may not vaporize. When it is required to add air to the gaseous mixture the valve 18 is moved to uncover the openings 16 and 15 and the air passing through such openings into the space 7 enters the hollow baffles 11 and escapes therefrom in minute jets through the openings 12 and mingles with the gaseous mixture, such air and mixture being caused to combine and blend by the action of the baffles in causing the air and mixture to take a tortuous path, the blending being further facilitated by the ribs or projections formed by corrugating the baffles. Should it be required at any time to gain access to the interior of the chamber 1 the baffles and their supporting plates 6 and 9 may be withdrawn throwing the open side of the chamber closed by means of the plate 4.

From the foregoing description, taken in connection with the accompanying drawing, the advantages of the construction and of the method of operation will be readily apparent to those skilled in the art to which the invention appertains, and while I have described the principle of operation of the invention, together with the devices which I now consider to be the best embodiment thereof, I desire to have it understood that the device shown is merely illustrative, and that such changes may be made when desired as are within the scope of the invention as claimed.

Having thus described the invention, what is claimed as new is:—

1. A device to be located in the fuel passage by means of which gaseous mixture is supplied to an internal combustion engine, the same consisting of a chamber, hollow baffles arranged within the chamber and provided with minute outlets and means for supplying air in regulated quantity to the spaces of such hollow baffles.

2. A device to be located in the fuel passage by means of which gaseous mixture is supplied to an internal combustion engine, the same consisting of a chamber, hollow baffles arranged within the chamber and formed with corrugated surfaces and having minute outlets and means for supplying air to the baffles in regulated quantity.

3. A device to be located in the fuel passage by means of which gaseous mixture is supplied to an internal combustion engine, the same consisting of a chamber, said chamber having an air space at one side, hollow baffles arranged within the chamber and in communication with the said air space and formed with minute outlets and means for supplying air in regulated quantity to the air space of the chamber.

4. A device of the character specified comprising a chamber having an air space at one side, two sets of corrugated baffles arranged within the chamber, the baffles of one set being oppositely inclined to the baffles of the other set and one set of baffles being hollow and in communication with the air space of the chamber and formed with a plurality of outlets and means for supplying air in regulated quantity to the air space of the chamber.

In testimony whereof I affix my signature in presence of two witnesses.

RALPH H. MacDONALD.

Witnesses:
J. W. WILLET,
O. L. HICKS.